Figures 18, 19, 20, 21:
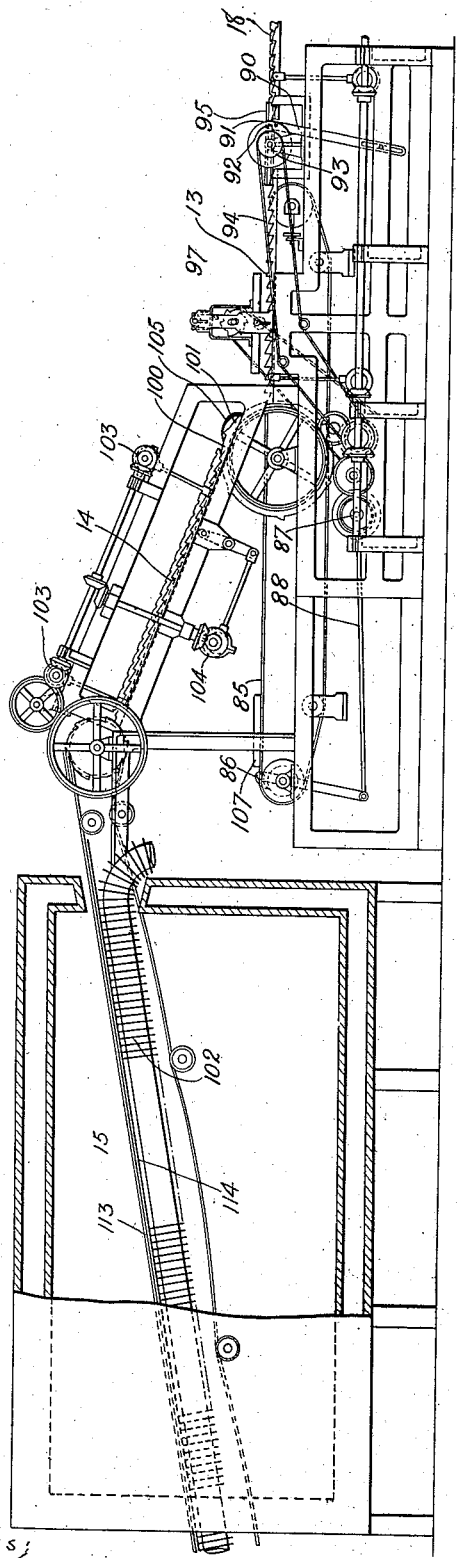

W. BOYD.
MACHINE FOR MANUFACTURING CHOCOLATE CONFECTIONERY.
APPLICATION FILED FEB. 24, 1915.
1,200,705. Patented Oct. 10, 1916.
6 SHEETS—SHEET 1.
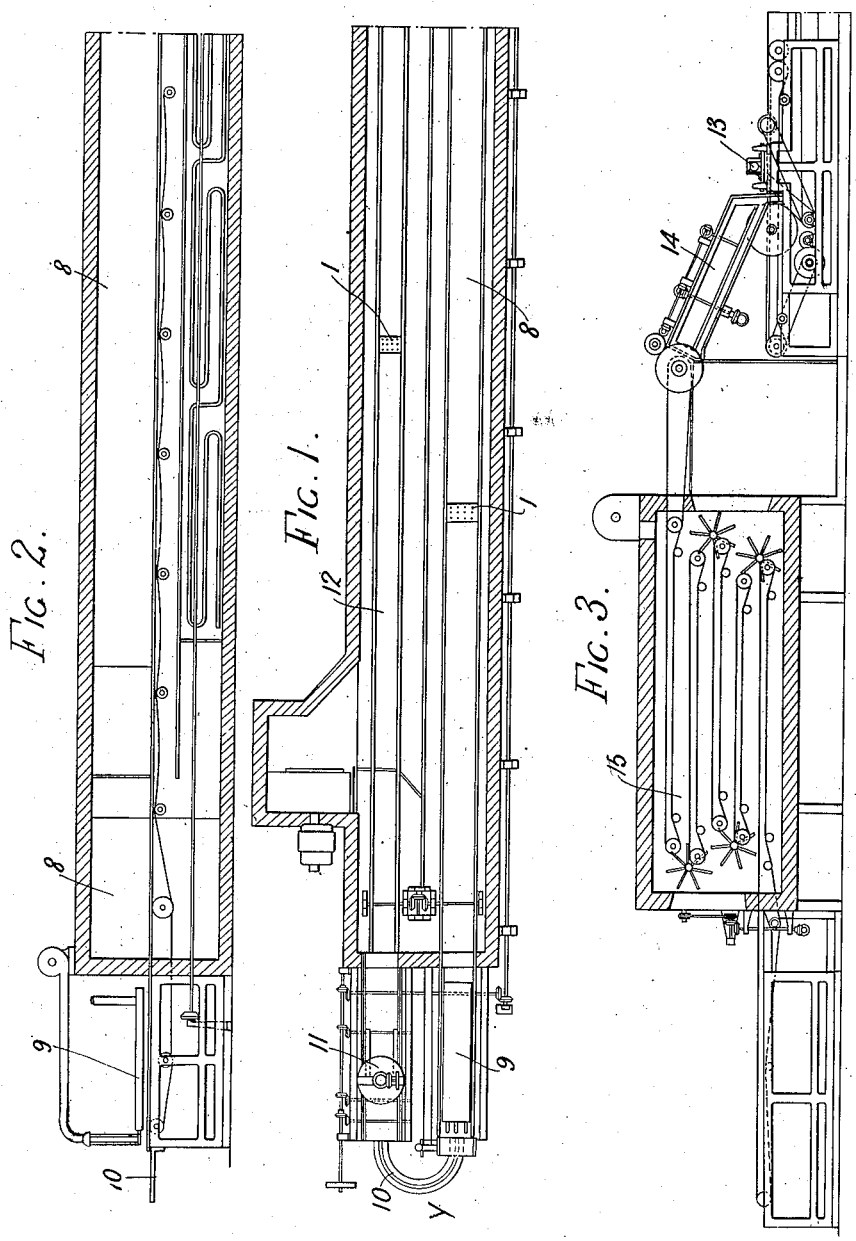

W. BOYD.
MACHINE FOR MANUFACTURING CHOCOLATE CONFECTIONERY.
APPLICATION FILED FEB. 24, 1915.
1,200,705.
Patented Oct. 10, 1916.
6 SHEETS—SHEET 2.
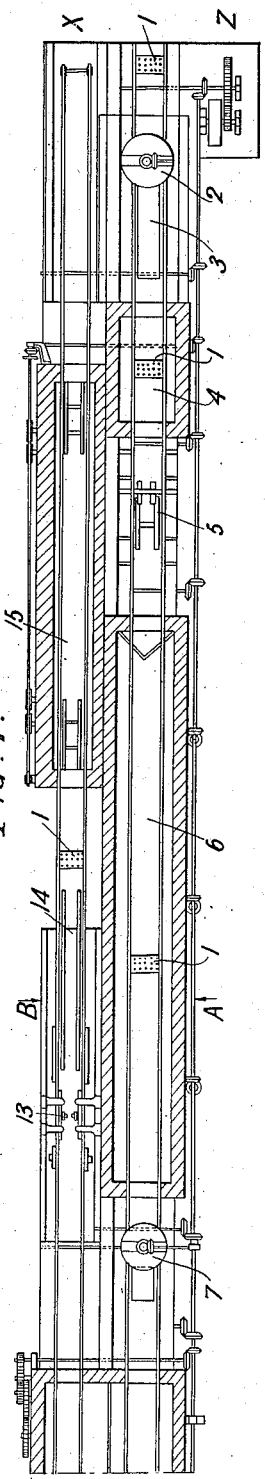
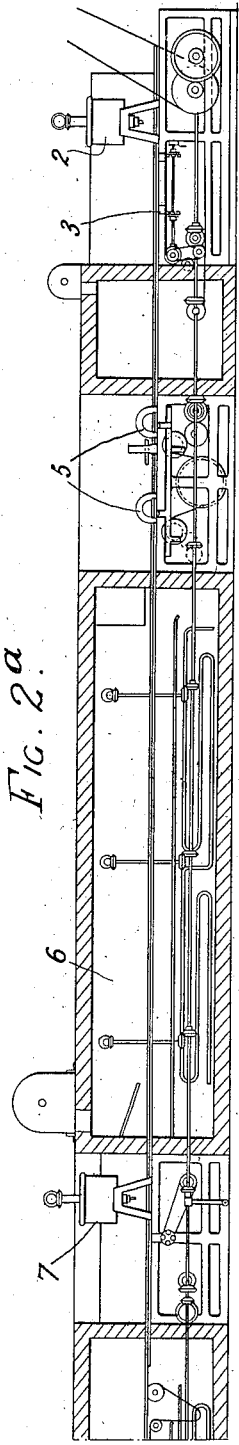
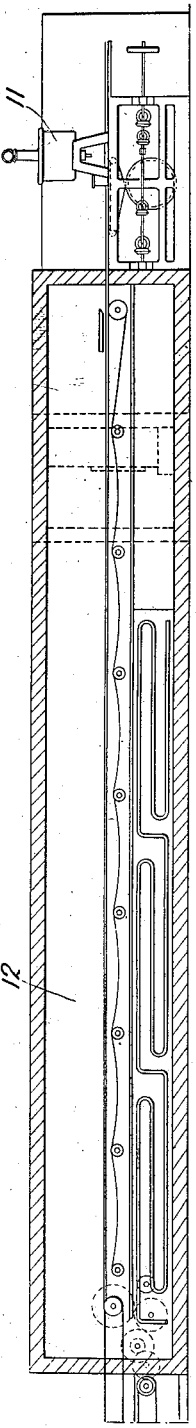
WITNESSES:
John C. Sanders
Dudley B. Howard
INVENTOR
William Boyd
BY
ATT.

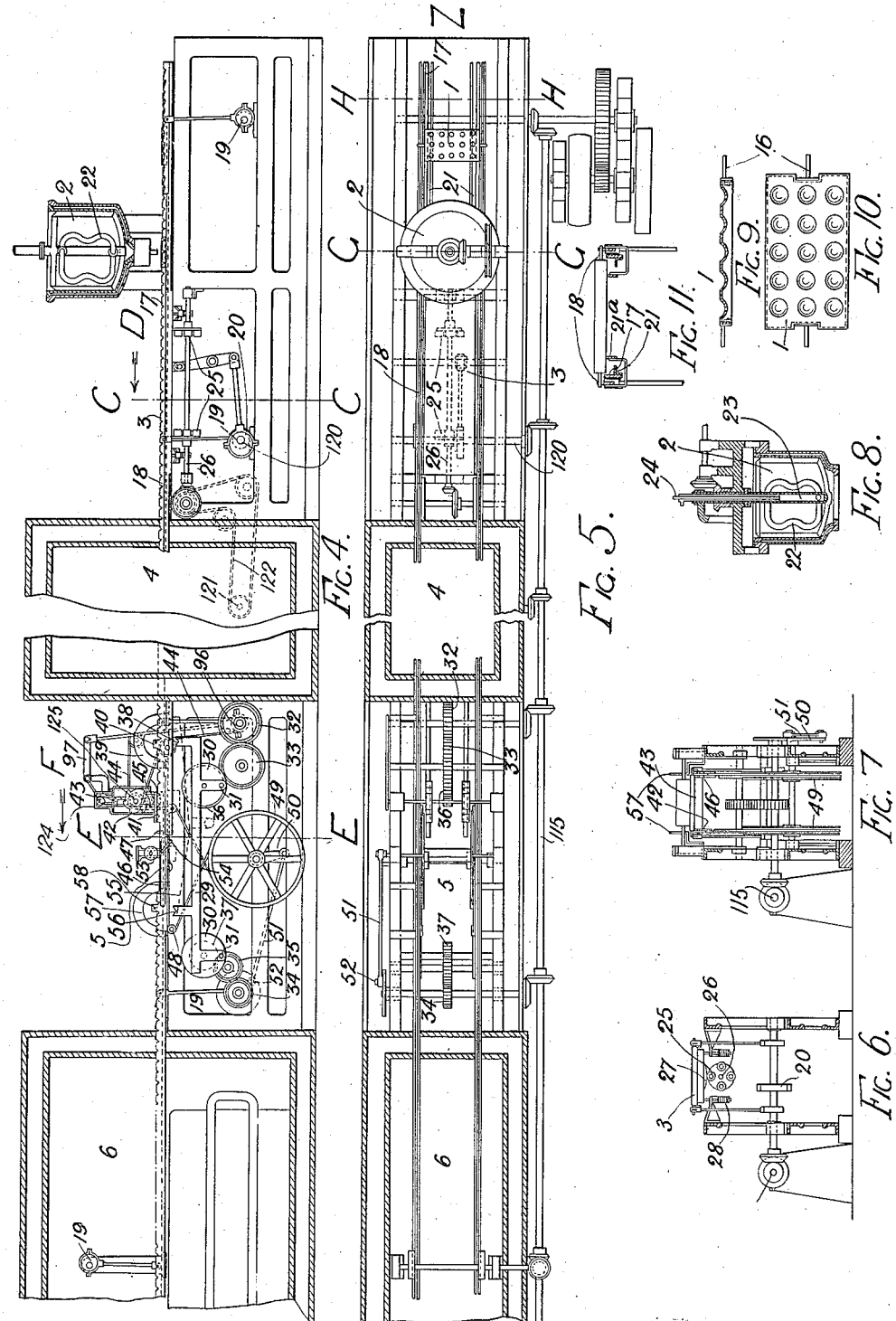

W. BOYD.
MACHINE FOR MANUFACTURING CHOCOLATE CONFECTIONERY.
APPLICATION FILED FEB. 24, 1915.
1,200,705.
Patented Oct. 10, 1916.
6 SHEETS—SHEET 4.
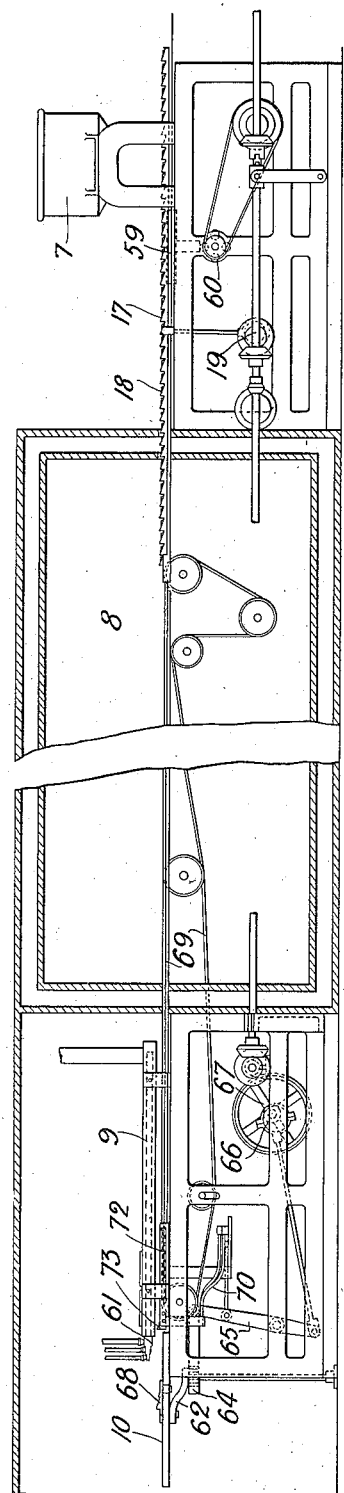
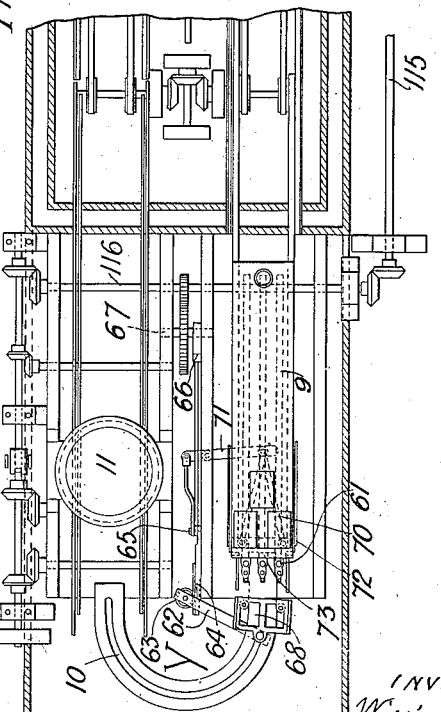
WITNESSES:
John E. Sanders
Dudley B. Howard
INVENTOR
William Boyd
BY
ATTY W. BOYD.
MACHINE FOR MANUFACTURING CHOCOLATE CONFECTIONERY.
APPLICATION FILED FEB. 24, 1915.
1,200,705.
Patented Oct. 10, 1916.
6 SHEETS—SHEET 5.
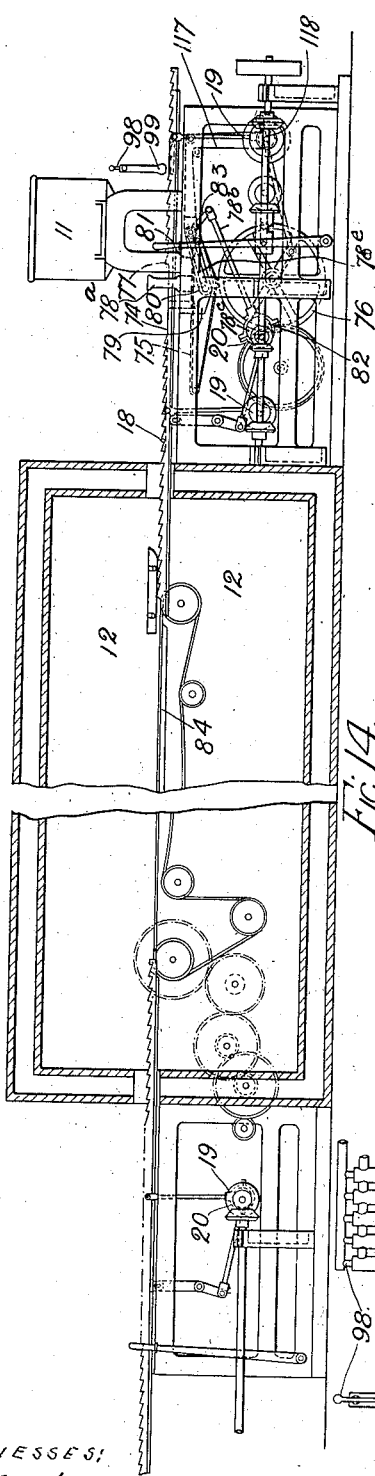
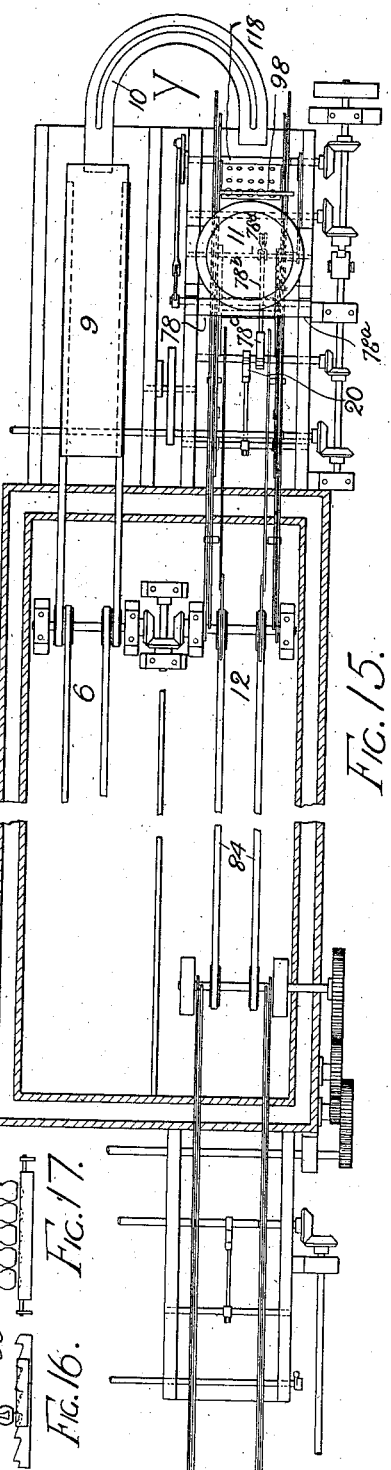
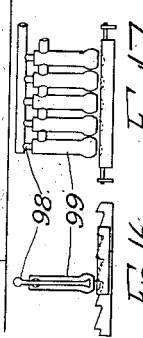
WITNESSES:
John C Sanders
Dudley G Howard
INVENTOR.
William Boyd
ATTY.

W. BOYD.
MACHINE FOR MANUFACTURING CHOCOLATE CONFECTIONERY.
APPLICATION FILED FEB. 24, 1915.

1,200,705.

Patented Oct. 10, 1916.
6 SHEETS—SHEET 6.

WITNESSES:
John C. Sanders
Dudley B. Howard

INVENTOR
William Boyd
BY
ATTY

UNITED STATES PATENT OFFICE.

WILLIAM BOYD, OF CLAREMONT, WEST FERRY, NEAR DUNDEE, SCOTLAND.

MACHINE FOR MANUFACTURING CHOCOLATE CONFECTIONERY.

1,200,705.  Specification of Letters Patent.  Patented Oct. 10, 1916.

Application filed February 24, 1915. Serial No. 10,245.

*To all whom it may concern:*

Be it known that I, WILLIAM BOYD, a subject of the King of Great Britain and Ireland, residing at Claremont, West Ferry, near Dundee, in the county of Forfar, Scotland, have invented certain new and useful Improvements in Machines for Manufacturing Chocolate Confectionery, of which the following is a specification, reference being had therein to the accompanying drawings.

This invention relates to machines for molding chocolates with cream or other centers, that is to say the main and novel purpose of the machine is to manufacture chocolate coated confectionery by first forming chilled shells or containers of chocolates, depositing hot liquid centers, into them, maintaining or further reducing the temperature of such shells and consequently lowering the temperature of the centers deposited therein sufficiently to preserve the shell, further heating the edges of the chocolate shells and the exposed surfaces of the centers to such a temperature as will enable the edges of the shell to combine with liquid chocolate which is finally deposited thereon, thereby completely covering the center after which the temperature is reduced sufficiently to set the completed shell, after which the goods are automatically rapped out of the molds which molds are then automatically re-heated.

In order that my said invention and the manner of putting the same into practice may be properly understood, I have hereunto appended six explanatory sheets of drawings in which the same reference numerals are used to indicate corresponding parts in the figures shown.

Figures 1 and 1ª (Sheets 1 and 2) are a general plan of the machine. Figs. 2 and 2ª (Sheets 1 and 2) are a view looking in the direction of the arrow A (Fig. 1) and Figs. 3 and 3ª (Sheets 1 and 2) are a view looking in the direction of the arrow B (Fig. 1). Fig. 4 (Sheet 3) is a part sectional elevation showing the feed end of the machine looking in the direction of the arrow A (Fig. 1). Fig. 5 (Sheet 3) is a plan of the same. Fig. 6 (Sheet 3) is a section at C. C. looking in the direction of the arrow D (Fig. 4.) Fig. 7 (Sheet 3) is a section at E. E. looking in the direction of the arrow F (Fig. 4.) Fig. 8 (Sheet 3) is a section at G. G. (Fig. 5) showing the internal arrangement of the depositor. Fig. 9 (Sheet 3) is a sectional view of a mold and Fig. 10 (Sheet 3) is a plan of same. Fig. 11 (Sheet 3) is a section at H. H. (Fig. 5.) Fig. 12 (Sheet 4) is a continuation of the view shown in Figs. 4 and 5 and shows the Y or return end of the machine looking in the direction of the arrow A (Fig. 1). Fig. 13 (Sheet 4) is a plan of same. Fig. 14 (Sheet 5) is a part sectional elevation of the Y or return end of the machine but looking in the direction of the arrow B (Fig. 1) and Fig. 15 (Sheet 5) is a plan of same. Fig. 16 (Sheet 5) shows in detail the alternative heating device and Fig. 17 (Sheet 5) is a face view of same. Fig. 18 (Sheet 6) is a continuation of the view shown in Fig. 14 and Fig. 19 (Sheet 6) is a plan of same. Fig. 20 (Sheet 6) is a sectional elevation of the lifting device and Fig. 21 (Sheet 6) is a side elevation of same.

The machine is provided with a long frame on which frame a series of molds 1 are traversed by chains from one end to the other, one immediately behind the other from the initial point of departure at Z or feed end of the machine along the machine to the turning or transferring point at Y and back again to X where there may be a turning or transferring device similar to that at Y thus placing the molds one after the other in their initial position.

Each mold in turn moves along the machine intermittently or continuously to suit the exigencies of the situation, or the movement may be an intermittent one throughout by using the intermittent movements shown and described instead of the traversing chains.

In order to make clear the working of the machine I will first give a general description of same and afterward described in greater detail the various parts. When moving from the starting point Z the metal molds move intermittently beneath the chocolate depositor 2 and are filled with liquid chocolate. They then pass over a vibratory table 3 its purpose being to settle the liquid chocolate equally in the molds and expel any air which may be in the liquid. After that the molds pass through a refrigerating chamber 4 where they are chilled and the film of chocolate formed on the sides of the mold leaving a liquid center of chocolate. The molds each in turn then pass to the emptying device 5 where they are first quickly turned upside down to allow the remaining liquid to drop out, the faces of the molds scraped and cleaned and again turned to their original position. Each mold now contains shells of chocolate and these molds with their shells are passed through the cold chamber 6 where their temperature is reduced low enough to prevent the shells of chocolate being melted by the hot centers which are now deposited in them. Each mold on emerging from the cold chamber passes intermittently and in turn beneath the hot center depositor 7. The temperature of the cold chamber is so adjusted that the chocolate shell is at a sufficiently low temperature to more than balance the melting action of the hot center. After passing the depositor 7 each mold moves in turn into the cold chamber 8 remaining long enough therein in its passage for the temperature of the centers to fall to the temperature of the mold. On emerging from the cold chamber 8 each mold passes under a hot plate 9 or equivalent device consisting of a hot air blast 98 where the exposed upper surfaces of the chocolate shells and centers are heated to the desired temperature. Each mold is then quickly passed by the return table 10 to the chocolate depositor 11.

Instead of having the heating device 9 or its equivalent placed before the return table 10 it is preferably situated immediately in front of the depositor 11 in order that the surfaces may remain liquid for the desired length of time. As shown in Fig. 15, both a hot plate and a hot air blast may be provided, and either of these used at will.

When each mold intermittently passes under the chocolate depositor 11 the exposed edges of each shell and center are covered with liquid chocolate and in their passage to the cooling chamber 12 the surplus chocolate is scraped off the mold.

On emerging from the cooling chamber 12 the molds containing the finished goods pass to an emptying machine 13 where they are rapped out of the molds, the empty molds passing up the gangway 14 and into the reheating chamber 15—preferably as shown in detail in Fig. 18—where in their passage they attain a temperature suitable for the chocolate which is first deposited On emerging from the re-heating chamber 15 the molds pass along to the feed end of the machine.

Coming now to the description of the working of the various parts of the machine. Each mold is provided with and carried by a pair of pins or trunnions 16, Figs. 9 and 10. The device for giving the intermittent motion comprises two fixed rails 17 one on one side and the other on the other side of the machine and having V shaped serrations of equal pitch on their upper edges into which serrations the pins carrying the molds are successively deposited. The means for transferring the molds from one serration to the other consist of two rails 18 also on each side of the machine and these rails have preferably L shaped serrations although they may be used plain. The latter two rails are made to oscillate in a circular or elliptical path, by a combined vertical and horizontal action given to them by eccentrics or cranks 19 which lift them vertically and other eccentrics or cranks 20 which move them horizontally, these being operated from the main shaft 115 by the cross-shaft 120, see Figs. 4 and 5. By this combined motion the pins of the molds are lifted out of one pair of serrations moved forward and deposited in another.

The molds are made to lie horizontally by means of two longitudinally bars 21 fixed to the bars 17 and by two bars 21ª fixed to the moving bars 18. See Figs. 4, 5, and 11. The bars 21 keep the molds level when their pins rest in the V serrations in the bars 17 and the bars 21ª retain them in the level position when they are lifted by the bars 18, and when there is a gap in the bars the molds are able to tilt or turn over, but can be again restored to the horizontal and when horizontal they are again carried forward by the bars 18.

The metal or other molds 1 are fed into the machine at Z and come under a liquid chocolate depositing device 2 which fills each transverse set of molds in turn. The chocolate depositor is of the usual type of ordinary cream depositors but adapted for this machine, being cylindrical, in order that it may accommodate a stirring device 22 provided with a warm water circulating device which keeps its contents at a uniform temperature. The warm water circulates through the larger pipe 23 through the stirring device 22 and away back again through the pipe 24. It is necessary that the lubricating oil or grease should not mix with the liquid chocolate and a brass cup is provided on the stirring devices to obviate this. After the molds are filled in the usual fashion they pass over a table 3 to which a vibratory motion is given in order that any air may be shaken out and thus allow the chocolate to come intimately in contact with the molds. The vibratory motion is given by the loose balls 25 on the rotary shaft 26 striking the projections 27 on the underside of the table 3, the springs 28 always tending to draw down the table. The shaft 26 is operated from the shaft 115 through the cross-shaft 121 and the chain 122. The molds then pass through a refrigerator or cooling box 4 where they are chilled and thus a film of the desired thickness of chocolate is formed. Each mold now comes to the gap in the bars previously mentioned where they are automatically inverted and empty themselves of the chocolate which has not solidified; and this action may be aided by the bottom of the mold being tapped by hammers or the like. The face of the inverted mold may now be automatically scraped to remove the surplus chocolate on the upper faces of the shells. Each mold is then automatically reversed to the original horizontal position. The mechanism for performing these operations consists of bars 29 one at each side of the machine which move in planes in a circular path by means of the two wheels 30 having crank pins 31 these being driven by the spur wheels 32, 33, 34, 35, 36 and 37. The bars 29 are formed with V gaps 38, 56, adapted to engage with the pins 16 of the molds. When the V gaps 38 in the bars 29 are in position to receive a pair of pins 16 of a mold such mold is lifted between the semi-circular guides 39 which serve to prevent sidewise movement of the molds and the forward edges of the molds come in contact with and are held by the projection 40 while the pins are being raised so that the mold is tilted upside down, and in the inverted position it passes under the vibratory spring hammer 41 whose action assists in the formation of the shells. The hammer is made to vibrate by means of the toothed wheel 42 whose teeth in turn come against the bar or projection 43 attached to the frame 124 to the bottom of which the hammer 41 is fixed the wheel being driven by the chain 44 and shaft 125. 45 is an eccentric whose purpose is to regulate the striking intensity of the wheel 42 by moving it closer to or farther away from the projection 43. In the drawing the wheel is shown out of gear. The eccentrics 96 operate the pressing lever 97 which by its motion causes the frame and with it the hammer to rise with the mold when it is being moved forward. 46 shows two sliding and reciprocating bars with projections 47 these bars being made to move by means of the chain 48, the vibratory wheels 49 are actuated by the crank 50 the connecting rod 51 and crank 52. At the right moment the projections 47 engage with the pins of an inverted mold and pull it quickly between the roller 53 and the scraper 54 thus causing the surplus chocolate to drop into the box 55. When the bars 46 are at the end of their travel the V gaps 56 are in position to receive the pins of the mold which is now lifted between the semi-circular guides 57 and is restored to its original position by means of the projection 58, which operates in the same way as the projection 40. The chocolate at this stage in the form of shells in their molds is not cold enough for being filled with the center and it is therefore made to pass through a refrigerator or cooling chamber 6 where the temperature is further reduced after which the hot liquid centers are deposited in the chilled shells of chocolate by means of a depositing hopper 7 Fig. 12 Sheet 4. The molds filled with the hot centers then pass on to a vibratory table 59 in order that the centers may be shaken down in their shells. This table is made to vibrate by means of the loose rollers 60 in the manner previously explained. They then pass upon traversing chains 69 through a refrigerator or cooling box 8 to reduce the temperature after which they are passed under a hot plate 9 or equivalent device, in order that the exposed edges of the chocolate shell and exposed surface of the center may be locally heated and softened. The plate 9 is heated by Bunsen burners 61. Although I have used a hot plate in the position shown for the purpose referred to I find it better to place the heating device adjacent to the depositor 11.

Another form of heating device, which may be provided in addition to the hot plate 9 and used alternately therewith at will, see Figs. 14, 16 and 17 Sheet 5 consists of one or more branched air pipes 98 through which a current of highly heated air is made to play on the surface of the mold and the goods. 99 is a casing through which the spent air is drawn away by means of a suction fan. I find the heated air is preferably used immediately before the chocolate is discharged from the depositor 11. The molds are then moved forward on their return journey by the intermittently moving device 10 under the third depositor 11 where the uncovered portions of the centers are covered by liquid chocolate, this covering forming the bottom of the finished goods after leaving the mold. The device 10 Figs. 12 and 13 consists of a vibratory arm 62 which is operated by the pinion 63 the rack 64 the lever 65 and the eccentric 66, driven by the rotating shaft 67, operated from the main shaft 115 and the cross-shaft 116. Pivoted to the arm 62 is a carriage 68. The molds are transferred from the traversing chains 69, which move continuously being operated from the main shaft 115, to the carriage 68 by means of the push bars 70 operated by the lever 71 from the lever 65. 72 are spring supported bars having inclined portions 73 which serve as stops to receive the advancing molds delivered by the chains 69. The bars 72 are held in a slightly raised position by the springs so that on the return stroke the bars 70 clear the front edge of the bottom of the molds; bars 70 then engage the rear of the molds and push them forward, over the raised portions 73 on to the carriage 68, the weight of the molds holding the bars 72 down so that the bars 70 remain in contact with the molds until they are pushed upon the carriage. At the other end of the travel the mold is taken by the intermittently traversing device 18 beneath the third depositor 11, where the uncovered portions of the centers and the shells are covered by liquid chocolate. When the molds pass this depositor they are quickly pulled forward by arms having a to and fro horizontal movement synchronizing with the intermittent moving device, in their motion passing under a scraper which removes the surplus chocolate. In cases where there is no surplus chocolate, no scraper need be used. This forwarding device consists of two vibratory arms 74 operated by a chain 75 and vibratory wheels 76 which are actuated in a manner similar to that previously described in conjunction with the mold reversing and scraping device 5, the projection 77 on the arms engaging with the mold. Each mold in its passage passes under the scraper 78 and the surplus chocolate drops into the box 79. The scraper is cleaned by the metal roller 80.

An eccentric 78$^c$ drives a rod 78$^b$ which is connected to an arm 83. This arm is connected to a shaft 78$^d$ which carries pulleys driven by chains 117 operated by the shaft 118. These pulleys drive chains 81 which rotate the roller 80. The roller is supported by arms 78$^e$ and rotates continuously. The rotation of the eccentric 78$^c$ causes the arm 83 to be turned through a portion of a circle and so causes the roller 80 to be raised in contact with the scraper 78 and then again lowered. The scraper 78 is carried by brackets 78$^a$.

The molds are now carried by conveyer chains 84 operated in the same manner as the chains 69 or other means to the front of the machine and in their passage pass through a refrigerator or cooling chamber 12 where the finished goods set and from whence they pass to emptying mechanism. This mechanism consists of a traversing belt 85 preferably of steel, moved intermittently in unison with the other intermittent traversing mechanism 17, 18 by means of the ratchet mechanism 86 operated from the side shaft 119 by the crank 87 and rod 88. Before the molds come to the belt 85 they have to be inverted and this is effected by means of a turning over device in which are rods 90 formed with V gaps 91 at their extremities which engage with the pins of the molds at the right time the desired motion being given to the V gaps by coupling the rods to the pins 92 on the rotatory disk 93. The disks are driven by the chains 94. 95 is a rotatory duplex grid so timed that it can receive a mold which is intermittently moved into place. This grid is turned over by the action of the V gaps 91 through 180° carrying the mold with it such mold then being intermittently taken out of it and along on the belt 85 which also intermittently moves with it. In order to retain the goods in the molds the grid is provided with fingers 96. After being thus inverted the molds pass under the rapping out device 123 which is similar to the vibratory hammer 41 except that no eccentrics 96 and lever 97 are required. At this stage the goods are loose in their molds. Each mold now passes to the wheels 100 where the pins are caught by the projections 101 and lifted on to the gangway 14 and moved along by intermittent mechanism operated by the eccentrics 103 and 104 in the manner the bars 18 are moved. As the molds are lifted they come against the projection 105 and are turned over to their normal position.

The goods 106 pass to a fixed receiver 107 which consists of a series of guides or compartments closed at the back in order that the goods may accumulate in rows of the desired length. It has been found by experience that the sides of the compartments should be parallel.

An exhaust lifter 108 is employed to lift a series of rows of sweets at one time and deposit them on paper trays placed in the boxes in which the goods are marketed. The lifter consists of a chamber 108 see Figs. 20 and 21 which is in connection with an exhaust chamber by means of the pipe 109. 110 are felt pads, one for each sweet and 111 are small pipes communicating with the chamber 108. 112 is a valve for admitting air and thus destroying the vacuum. The appliance is placed above a series of arranged goods in 107 and a vacuum created in the chamber. When this happens each pad has a sweet attached to it and on lifting the appliance the desired number of sweets set in order are transferred to the paper tray in its box, the sweets being released by admitting air through the valve 112. The molds now pass through the reheating chamber 15 and on to the front of the machine. The heater consists of a gill steam pipe 102 and metal tray 113 and the molds are moved along by the chains 114.

Although I have described a machine in which three depositors are used yet I may use groups of depositors, that is to say I may use two or more depositors, one behind the other for the purpose of depositing a variety of centers in the chilled chocolate shells, the object being to make a variety of goods at one and the same time.

Having now described my invention what I claim as new and desire to secure by Letters Patent is:—

1. In a candy making machine the combination of metal molds provided with trunnions; means for traversing the molds through the machine by the aid of their trunnions; a chocolate depositor provided with a warm water stirring device; a vibratory table; a refrigerating chamber; an inverting device by which the molds are inverted; a second vibratory device for removing the surplus material; a scraping device for scraping the inverted molds; means for returning the molds to their original position; a second refrigerating chamber; a hot center depositor; a third refrigerating chamber; a hot air heating device for softening the edges of the goods in the molds; a depositor for covering the exposed surfaces of the goods; a scraper for removing the surplus material; a fourth refrigerating chamber for cooling the finished goods; means for discharging the finished goods and means for re-heating the molds for the next operation.

2. In a candy making machine, molds provided with trunnions, means for intermittently forwarding the molds comprising in combination oscillating rails having serrated upper edges adapted to engage the trunnions of said molds, flat rails fixed thereto to prevent tipping of the molds, fixed rails having serrated upper edges also adapted to engage the trunnions of said molds, fixed flat rails, and means to operate said oscillating rails.

3. In a candy making machine, molds, serrated bars for carrying said molds; trunnions on said molds for engagement with said serrations; bars adapted to engage the trunnions of said molds; means for giving a circular motion to said bars to lift the molds out of the serrations and traverse said molds through a semi-circular path, and stops to engage the forward ends of the molds and cause same to be inverted.

4. In candy making machines, molds provided with trunnions, means for intermittently forwarding said molds, and means for partially emptying the molds comprising in combination with means for inverting and righting the molds, a vibratory hammer, a toothed wheel to actuate said hammer, and means of adjusting the position and force of impact of said hammer.

5. In a candy making machine the combination of metal molds provided with trunnions; means for traversing the molds through the machine by the aid of their trunnions; a chocolate depositor provided with a warm water stirring device; a vibratory table; a refrigerating chamber; an inverting device by which the molds are inverted; a second vibratory device; a scraper for scraping the surface of the inverted molds; a roller adapted to press the molds against said scraper; means for returning the molds to their original position; a second refrigerating chamber; a hot center depositor; a third refrigerating chamber; a hot air heating device for softening the edges of the goods in the molds; a third depositor for covering the exposed surfaces of the goods; a second scraper; means for operating said scraper; a fourth refrigerating chamber for cooling the finished goods; means for discharging the finished goods and means for re-heating the molds for the next operation.

6. In a candy making machine, means for locally heating the exposed edge of the shell and the surface of the center of the candy, consisting of branched pipes adapted to direct hot air upon said surfaces, and pipes surrounding aforesaid pipes adapted to remove the air after use.

7. In a candy making machine means for transferring molds to the return path, consisting of a semi-circular track; a carriage pivotally connected to a rotatable arm adapted to travel on said track; a shaft carrying said rotatable arm; an eccentric and rod for rotating said arm and push bars operated from said eccentric rod for pushing said molds on to said carriage.

8. In candy making machines, means for scraping the molds comprising a scraper, horizontally reciprocating bars adapted to engage the molds and draw them under said scraper, means to operate said bars; a roller fitted with a scraper adapted to clean aforesaid scraper, and means to periodically bring said roller into contact with said scraper.

9. In candy making machines, means for inverting the molds consisting of a duplex rotary grid, means for entering a mold into said grid, notched bars adapted to engage the mold trunnions, and means to operate said bars to invert mold and grid.

10. In candy making machines, molds provided with trunnions; rotatable wheels provided with radial projections for raising said mold by said trunnions; a projection adapted to contact with the mold and cause it to turn over when lifted by said wheels; serrated inclined bars intermittently operated for receiving said molds and traveling same in an upward direction; downwardly declined chains working in conjunction with said serrated bars for traversing the molds through a heater and returning them to the initial position.

11. In candy making machines, in combination, a rotary duplex grid for inverting the molds provided with means to retain the goods in the molds during the inversion, means for rapping out the goods from the molds, wheels provided with lugs for transferring the molds to the return gangway, a stop to act in conjunction with said wheels to turn the molds right side up; a belt to receive the goods from the molds, a receiving device to line up the goods, and a lifting device for the removal of the goods.

In testimony whereof I affix my signature in presence of two witnesses.

WILLIAM BOYD.

Witnesses:
GEORGE CAMERON DOUGLAS,
WILLIAM DEMPSTER.